United States Patent [19]

Claisse

[11] 4,045,202

[45] Aug. 30, 1977

[54] FUSION AND CASTING MACHINE

[76] Inventor: Fernand Claisse, 230 Boul. Monaco, Quebec, Quebec, Canada, GIP 3H2

[21] Appl. No.: 575,475

[22] Filed: May 7, 1975

[30] Foreign Application Priority Data

Sept. 9, 1974 Canada .................................. 208712

[51] Int. Cl.² .......................... C03B 5/18; C03B 9/00; F27B 14/02
[52] U.S. Cl. ...................................... 65/178; 65/179; 65/181; 65/66; 65/68; 432/157
[58] Field of Search .................. 65/32, 178, 157, 134, 65/164, 179, 180, 181, 66, 68; 432/157

[56] References Cited

U.S. PATENT DOCUMENTS

| 1,370,673 | 3/1921 | Scholes et al. | 65/134 |
| 2,006,947 | 7/1935 | Ferguson | 65/178 X |
| 3,215,423 | 11/1965 | Taylor | 65/178 X |
| 3,451,794 | 6/1969 | Patterson | 65/157 X |
| 3,754,886 | 8/1973 | Richards et al. | 65/178 X |

Primary Examiner—S. Leon Bashore
Assistant Examiner—Frank W. Miga
Attorney, Agent, or Firm—Alan Swabey & Co.

[57] ABSTRACT

This invention relates to a fusion and casting machine for the preparation of glass buttons for analysis.

The machine contains an assembly of several heaters which moves with a precession motion imparting agitation to the content of the molten materials. When the materials are fused, agitation stops, flame goes out, moulds which were intially above the crucibles move under the crucibles, and the crucibles turn over and transfer their content into the moulds where solidification takes place. Perfect glass buttons are produced: these are stable, homogeneous, flat, smooth, bubble-free and need no further processing before the anaylsis.

6 Claims, 8 Drawing Figures

U.S. Patent    Aug. 30, 1977    Sheet 1 of 4    4,045,202
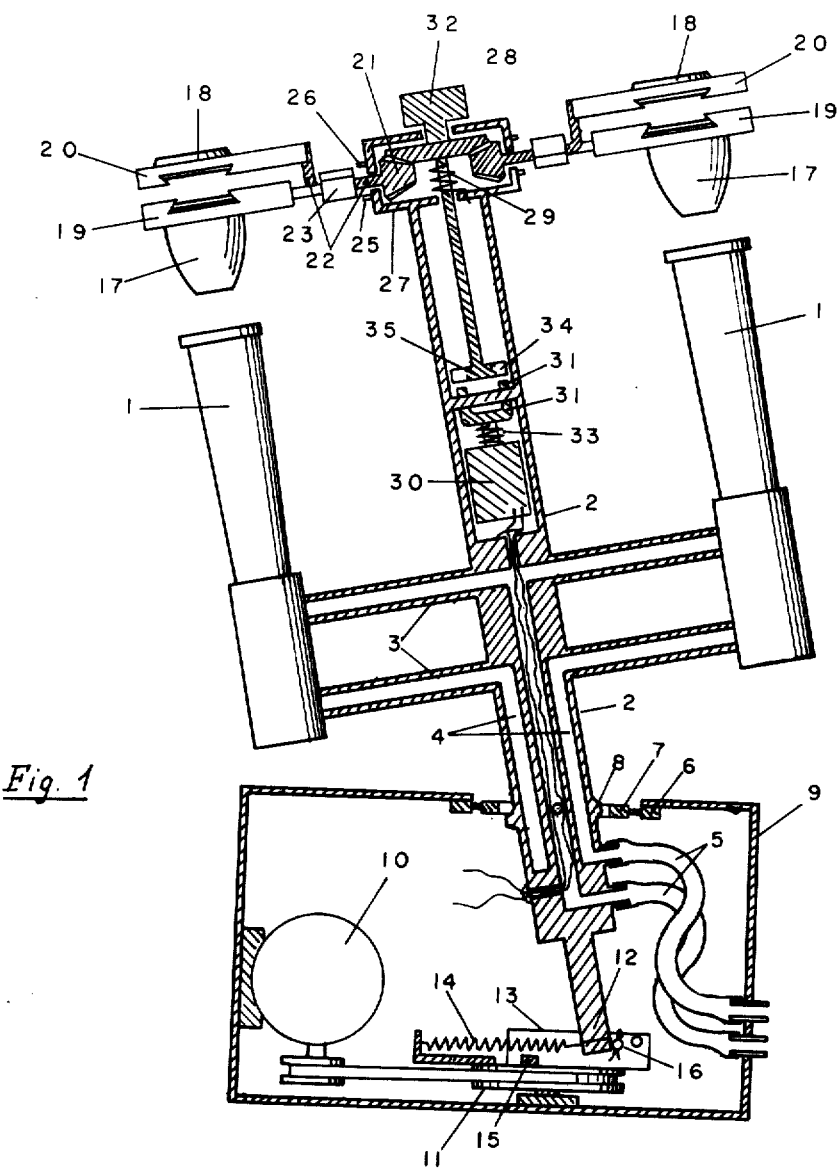
Fig. 1
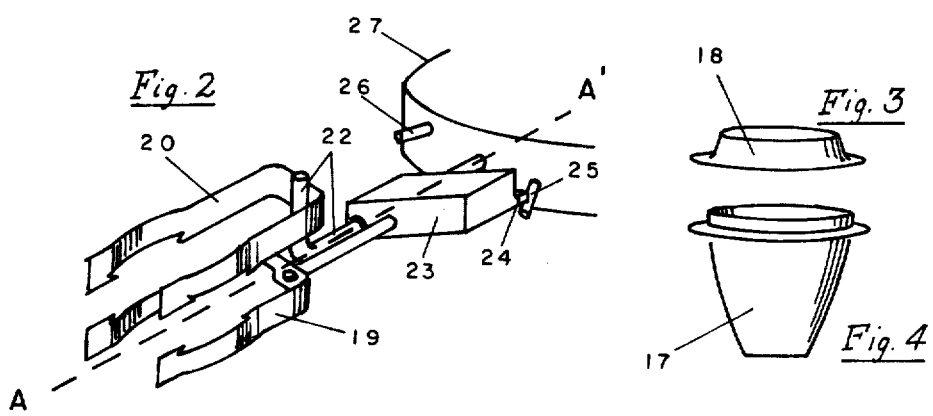
Fig. 2
Fig. 3
Fig. 4

19# FUSION AND CASTING MACHINE

This invention relates to a machine to make glass buttons.

It is well-known that chemical composition of most substances can be determined from their x-ray emission spectra when they are excited by x-rays or electrons. In 1956 I discovered a method of sample preparation (Quebec Department of Mines, P.R. No. 327, (1956); Norelco Reporter, Vol. 3, p. 3 (1957) which makes such a x-ray analysis more accurate and which has been adopted by several laboratories in the world. The method is called "fusion method, borax bead method" or "Classic method." The proposed procedure consists of heating a mixture of sample and some other substance, for example borax, in a crucible until the mixture melts and pouring the molten material into a ring on a hot plate to obtain, after cooling, a glass button on which analyses are performed. The results of the analyses are excellent when this technique is used but the preparation of the buttons as described in the original publications is critical and has some inconveniences: the operator must agitate the crucibles frequently, handling of hot materials is dangerous, high intensity thermal and visible radiations are troublesome and uncomfortable, life of crucibles is short, surface of buttons is not smooth, and a trained operator is necessary.

Machines have been invented to prepare glass buttons but they do not eliminate all the difficulties mentioned above and they also have limitations of their own; for example, the buttons need grinding and polishing before analysis, buttons of different sizes cannot be made unless important modifications are made in the machine, production rate of buttons is low, machines are heavy, complex and difficult to service, initial cost of machines is high and cost of crucible replacement is also high.

On the other hand, I have invented a machine which is simple, portable, versatile, economical to build and to operate and which produces automatically, rapidly and simultaneously several glass buttons of high quality which do not require further processing before analysis.

The machine I have invented has three main functions: fusion, homogenization and casting.

One of the objectives of my invention is to provide an effective way of fusing and homogenizing several samples simultaneously, which is done by connecting several sources of heat, for example gas burners, to a column through which energy is supplied to the heat sources, and connecting the column through a Hooke joint which allows the column and the heat sources attached to it to move with a precession motion about the vertical axis; the crucibles with their content are held above the heat sources and move with them. The swirling motion of the crucibles produces strong convection currents in the liquid as soon as the material begins to melt, thus decreasing the time for melting and for obtaining homogeneity in the melt.

Another objective of my invention is to provide a simple way of casting the samples and for that, I have invented a new device for holding and moving the crucibles and the moulds. In this device, a fork holds a flat bottom mould above a crucible and the crucible is held by another fork which is loosely attached to the shaft of the fork which holds the mould. At the time of casting, the mould moves under the crucible and before it reaches its final positon it compels the crucible to turn over and to transfer the melt into the mould where solidification takes place.

Other objectives and how they are achieved, as well as a fuller understanding of my invention may be had by referring to the following description and claims, taken in conjunction with the accompanying drawings in which:

FIG. 1 represents a cross section of a machine in which the heat sources are gas burners and in which casting is done by means of a loaded spring mechanism;

FIG. 2 represents a perspective view of the holders for crucibles and for moulds;

FIG. 3 represents a perspective view of a mould in the inverted position;

FIG. 4 represents a perspective view of a crucible;

Figure 5:
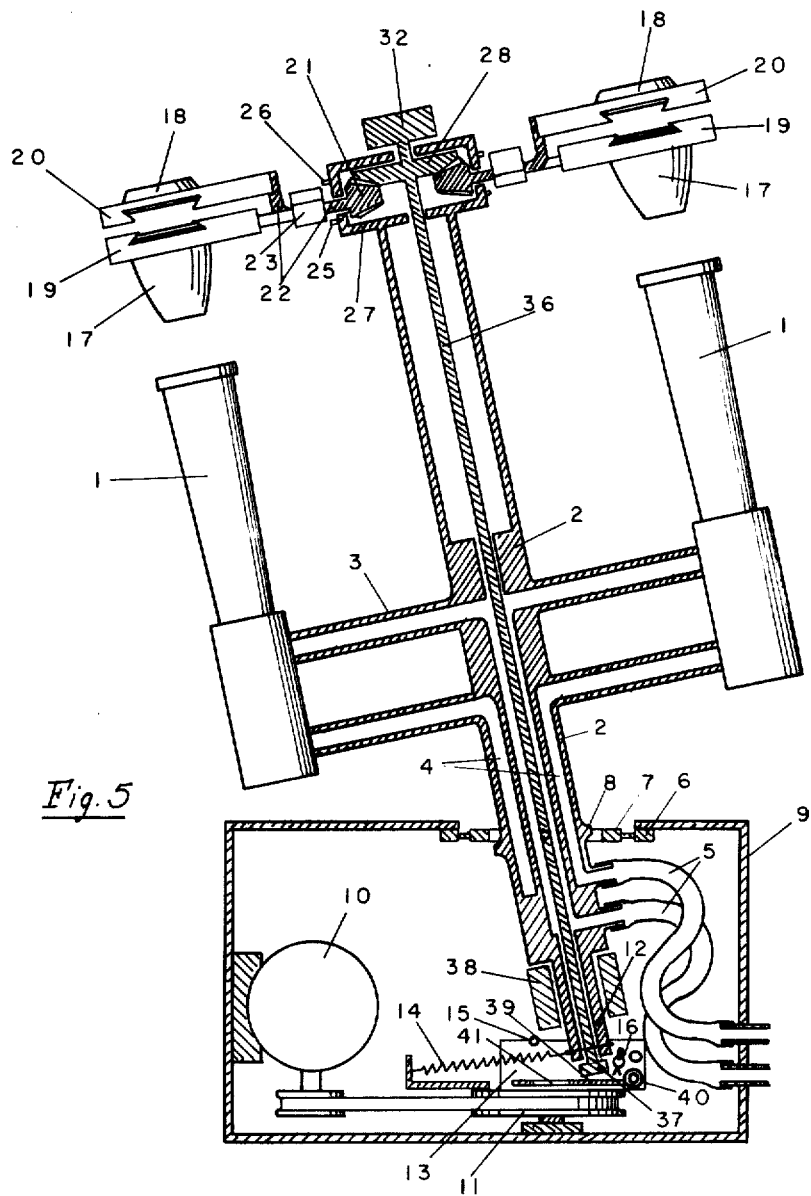
FIG. 5 represents a cross section of a machine in which casting is done by means of the motor used for agitation.

With reference to the drawings, a machine which I have built is shown in FIG. 1 and comprises:

an assembly of gas burners 1 attached to a column 2 by means of pipes 3 which are used to supply gases to the burners; gases for the burners also pass through the interior 4 of column 2, and through flexible tubings 5;

a Hooke joint 6, 7, 8 which allows inclination of the column in all directions, towards front, rear, left or right, but which prevents the rotation of the column around its own axis; this movement of the column results from the design of the Hooke joint which comprises three concentric rings and two axis of rotation perpendicular to each other; the external ring 6 is fixed to the cabinet 9 of the machine; the intermediate ring 7 rotates inside the external ring 6 around one of the diameters of the external ring and allows inclination of the column between the front and back; the internal ring 8 is fixed to the column 2 and rotates inside the intermediate ring 7 around a diameter of the intermediate ring perpendicular to the other axis of rotation and allows inclination of the column between left and right;

a variable speed motor 10 with pulley 11 to produce a circular motion to one end of the column 2, for example the lower end 12;

a guide 13 fixed to pulley 11 which comprises two vertical and parallel walls between the end 12 of column 2 is free to move; and a spring 14 attached to the pulley 11 and loosely looped around end 12 of the column; when motor 10 does not run, spring 14 pulls the end of the column towards the center of the pulley where it stops on pin 15, and maintains the column in a vertical position; when motor runs, the centrifugal force on column 2 and on parts attached to it, maintains the column in an inclined position; the inclination can be changed by placing pin 16 in one of the several positions available; increasing the inclination of the column results in a more vigorous agitation in the crucibles;

since the spring 14 rotates with the guide 13 but since the column 2 does not rotate, it is obvious that the spring 14 is only loosely attached around the end 12 of column 2;

crucibles 17 for fusing materials and moulds 18 for forming glass buttons; examples of crucible and mould which can be held securely without danger of ejection during agitation are illustrated in FIGS. 3 and 4;

supports 19 for crucibles and supports 20 for moulds as shown in FIGS. 1 and 2; a recess on each side of supports has been cut for holding securily crucibles and moulds of shapes illustrated in FIG. 3 and 4 but other shapes of supports can be built for other shapes of crucibles and moulds; supports 20 for moulds are connected to gears 21 through shaft 22 and can turn about axis AA'; supports 19 for crucibles are connected to counterweights 23 which turn freely about shaft 22, this rotation being limited by the free motion of stop 24 between pin 25 and pin 26 on gear housing 27;

it is understood from FIGS. 1, 2, 6 and 8 that the mould is below the crucible when the molten glass flows from said crucible but this is clearer shown in FIG. 7 which is included to provide more details. Gear 21 is connected to shaft 22 which is connected to the mould holder 20. When casting is done, gear 21 rotates and the mould rotates with it in the direction of the arrows until a full half of a turn has been made. During the first quarter turn of rotation of shaft 22, the crucible does not move because shaft 22 passes freely inside the counterweight 23; the force of gravity pulls on counterweight 23 and crucible 17 in the holder 19, and maintains them in the position shown in FIG. 2 and FIG. 7. When the shaft 22 has turned about one quarter of a turn, the bent part of the shaft 22 close to the holder 20 abuts against the projection 43 of the crucible holder 19 and further rotation of the shaft 22 forces the holder 19 and the counterweight 23 to turn also. When the counterweight has rotated about one quarter of a turn, the center of gravity of the counterweight 23 and crucible 17 in the holder 19 has reached a point to the left of the axis AA', and the force of gravity makes the crucible turn faster and tip over almost completely so that the molten glass flows rapidly into the mould which has just reached its casting position.

Figure 6:
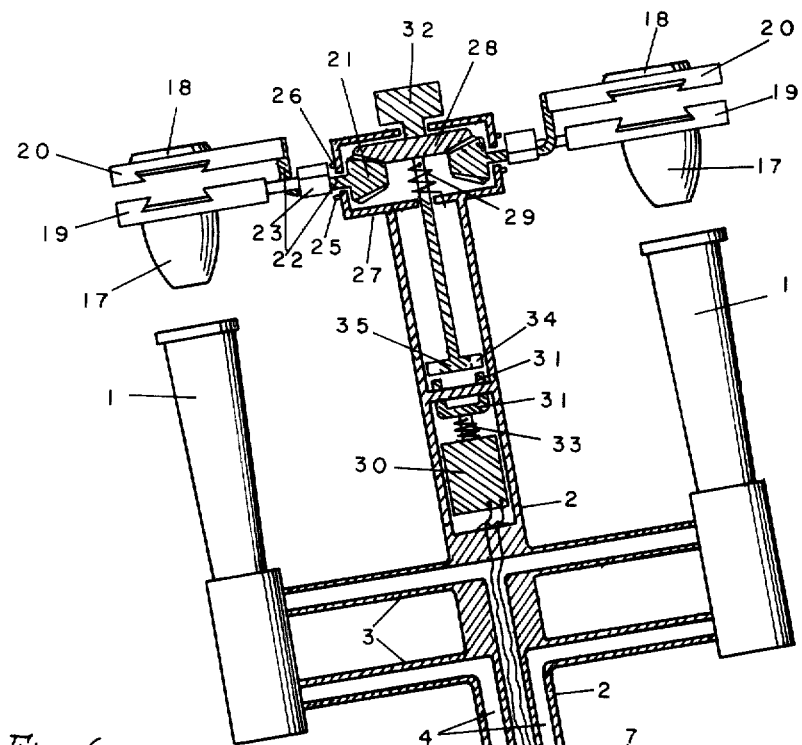
FIG. 6 is the same as FIG. 1 except that the rod between the crucible holder and the counterweight has been raised slightly and that the attachment of a spring at the lower end of the column is more clearly shown.
Figure 7:
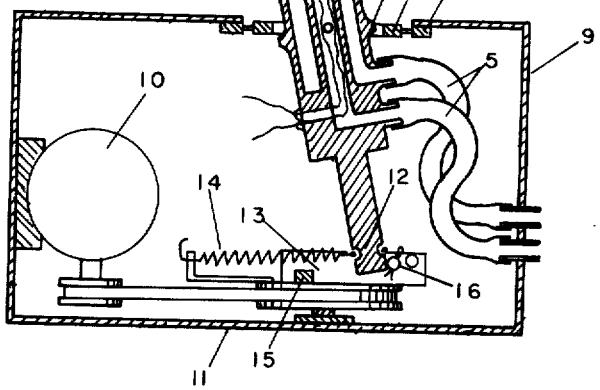
FIG. 7 is the same as FIG. 2 except that it shows the position of one of the gears inside the housing the direction of rotation of the mould and the protusion which was only suggested in FIG. 2.
Figure 7:
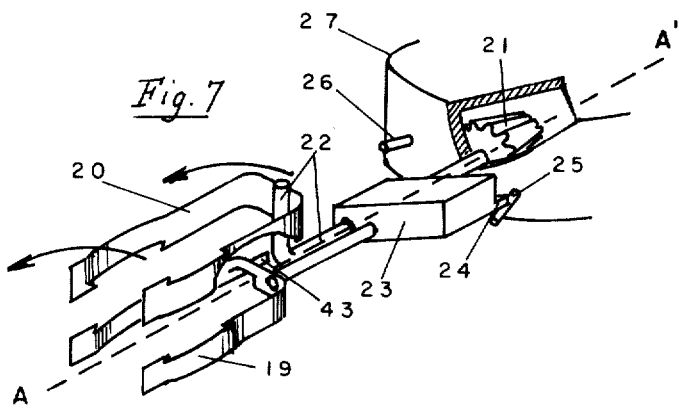
Figure 8:
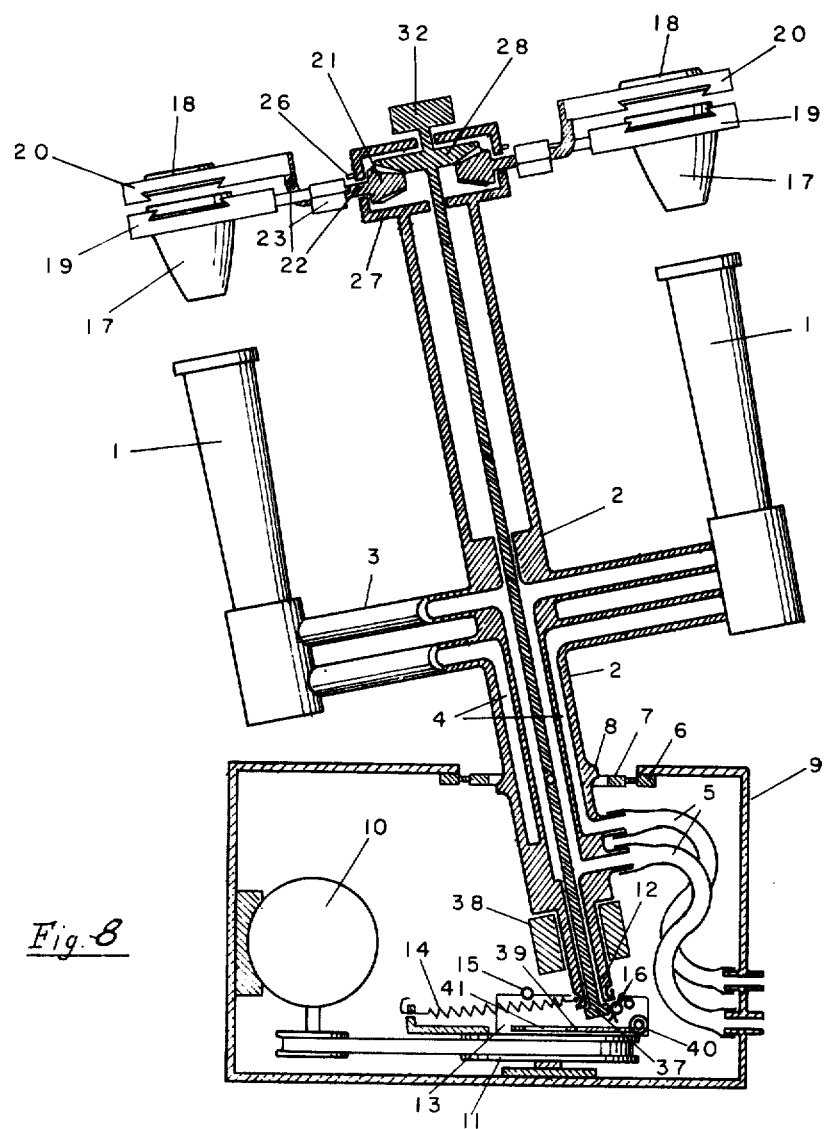
FIG. 8 is the same as FIG. 5 except that the rod between the crucible holder and the counterweight has been raised slightly.

In FIG. 7 the projection 45 for flipping over the crucible holder 19 is shown and the area of the crucible holder 19 from which the protrusion 43 has been cut can also be seen. In FIG. 2 the protrusion 43 is not shown but the area from which it has been cut can be seen. Of course, there are many equivalent ways to do that which are known to those skill in the art. In any case, the mould should rotate in the direction indicated by the arrows in FIG. 7;

in FIGS. 6 and 8 the rod between the crucible holder 19 and the counterweight 23 has been raised slightly so as to better indicate that this rod is not connected to the gear 21; it is the shaft 22 of the mould holder 20 which is connected to gear 21;

a mechanism for casting comprising main gear 28 (FIG. 1), secondary gears 21, sping 29, coil 30 and U-shape pin 31; when external end 32 of main gear axis is turned, spring 29 becomes stressed and eventually spring 33 pushes U-shape pin 31 into slots 34 in piece 35 blocking gears 21 and 28; when coil 30 is electrically actuated, pin 31 is pulled back, spring 29 runs down and compels gears to return to their initial positions;

a conventional control box (not illustrated) comprising electromechanical gas valves, electrical switches and timers to control motor 10, coil 30 and flow of gases in burners can be added to control the machine automatically.

During fusion and agitation mould holders 20 and crucible holders 19 are in positions shown in FIG. 2: moulds are in the inverted position, as in FIG. 3, in their holders 20, and crucibles are in the normal position as in FIG. 4, in their holders; stop 24 (FIG. 2) rests on pin 25, in that position the moulds attain a temperature sufficiently high for successful casting but much lower than that of the crucibles; this arrangement is very convenient because high temperatures are desirable in the crucibles to accelerate fusion and to fuse highly refractory materials, while such high temperatures are undesirable at the mould because the flat surface of the moulds would deform by heat and the glass buttons produced would need grinding and polishing.

When the fused material is ready to be cast, one turns off motor 10 stopping agitation and allowing spring 14 to bring burners 1 into the upright position; then one actuates the gas valves blowing the flames out; then one actuates coil 30 allowing spring 29 to run down and to compel gears 28 and 21 to rotate with a resultant of the mould shafts 22 by 180 degrees, so that moulds turn over and stop in a horizontal position under crucibles; at about the middle of their trajectory the mould shaft 22 start pushing on projection 43 of the crucible supports 19 and crucibles begin to turn also; the resultant change in position of center of gravity of counterweights 23 makes crucibles to continue rotating until stops 24 rest on pins 26; in this position the crucibles are nearly inverted above the horizontal moulds so that the molten products flow into the moulds where they solidify as buttons.

As an example of the various modifications that can be made of the invention herein described, a description of a similar machine with a different mechanism for casting is illustrated in FIG. 5; this machine comprises a shaft 36 attached to gear 28 and terminated at its lower end by the nut 37, a coil 38, a rectangular plate 39 which can be magnetised, which is hinged at one side 40 and which contains a hole 41 slightly larger but of same shape as nut 37; when agitation is finished and column 2 has come in the upright position, current is passed in coil 38 which produces a magnetic field which pulls plate 39 upwards, forcing hole 41 against nut 37; then, motor 10 is started, and hole 41 rotates relatively to the immobile nut 37 until they both engage, forcing shaft 36 to rotate also and compelling gears 28 and 21 to rotate with a resultant rotation of the mould shafts 22 by 180 degrees as in the machine illustrated in FIG. 1 and described earlier in this disclosure.

A similar machine can be designed with motor 10 and pulley 11 acting on upper end 32 of column 2.

Only two burners are shown in FIG. 1 and 5 but a machine can be made with as many burners as space permits. Burners can also be replaced by electrical resistors, induction heaters or other means of heating.

The machine described above can be used as a simple agitator for chemical or mechanical processes when casting is not required, such as in chemical reactions, fusions, evaporations, dissolutions, mixing; in such cases, the machine can be used as described or the burners can be replaced by an electrically heated plate on which containers to be agitated are placed.

Since various modifications can be made in the invention herein-before described and as illustrated in the accompanying drawings, and numerous variations made thereto all within the spirit and scope of the invention without departing from such spirit and scope, it is intended that the said description and drawings are to be interpreted as illustrative only, and not in a limiting sense, and that only such limitations should be placed upon my invention as are specifically contained in the definition thereof as expressed in the accompanying claims.

The embodiments of the invention in which an exclusive property of privilege is claimed are defined as follows:

1. A machine for making glass buttons, comprising:
   a base (9);
   an upstanding column (2) pivoted at a pivot joint (6, 7, 8) adjacent its lower end to said base for universal lateral tilting movement;
   drive means (11) below said pivot joint for swinging the lower end of said column in substantially circular motion;
   a normally upright crucible (17) for a charge to be melted carried by the upper end of said column for tilting about a horizontal axis;
   a mold (18) for receiving a molten charge and means (20 and 22) on said column holding said mold in inverted position over said crucible and mounting said mold for pivotal movement about said horizontal axis;
   heater means (1) on said column arranged to heat said crucible and mold simultaneously;
   means (21, 28) for rotating said mold about said horizontal axis and lost motion means (43) between said crucible and mold for tilting said crucible about said horizontal axis after a predetermined degree of tilt of said mold; and
   means (14) for rendering said drive means inoperative when said mold and crucible are being rotated about their respective axes.

2. A machine as defined in claim 1 wherein said pivot joint (6, 7, 8) prevents rotation of said column about its longitudinal axis.

3. A machine as defined in claim 1 wherein said drive means comprises a member (11) rotatable about a vertical axis and having a radial guide (13) thereon, the lower end of said column slidably engaging said radial guide, spring means (14) urging the lower end of said column toward the center of said member, and stop means (15 and 16) for limiting movement of said lower end along said guide.

4. A machine as defined in claim 1 wherein said mold is mounted on a U-shaped support (20) at the end of an L-shaped shaft (22) defining said horizontal axis, said crucible being mounted at the end of a straight shaft adjacent said horizontal axis and rotatable therearound.

5. A machine as defined in claim 4 including a first gear (21) on said L-shaped shaft, a second gear (28) journalled on said column and meshing with said first gear whereby rotation of said second gear effects rotation of said L-shaped shaft to pivot said mold about said horizontal axis.

6. A machine as defined in claim 5 including selectively operable means (30–35 or 32 or 39) for rotating said second gear.

* * * * *